Feb. 18, 1936.  B. C. ROEHRL  2,031,071
PHOTOGRAPHIC COPYING APPARATUS
Original Filed Jan. 13, 1933  5 Sheets-Sheet 1

INVENTOR.
BRUNO C. ROEHRL.
BY Philip S. Hopkins
ATTORNEY.

Feb. 18, 1936.  B. C. ROEHRL  2,031,071
PHOTOGRAPHIC COPYING APPARATUS
Original Filed Jan. 13, 1933  5 Sheets-Sheet 2

INVENTOR.
BRUNO C. ROEHRL.
BY
ATTORNEY.

Feb. 18, 1936.  B. C. ROEHRL  2,031,071
PHOTOGRAPHIC COPYING APPARATUS
Original Filed Jan. 13, 1933  5 Sheets-Sheet 3

INVENTOR.
BRUNO C. ROEHRL.
BY
ATTORNEY.

Patented Feb. 18, 1936

2,031,071

UNITED STATES PATENT OFFICE 2,031,071

PHOTOGRAPHIC COPYING APPARATUS

Bruno C. Roehrl, Binghamton, N. Y., assignor to Agfa Ansco Corporation, Binghamton, N. Y., a corporation of New York Application January 13, 1933, Serial No. 651,459
Renewed July 17, 1935

6 Claims. (Cl. 88—24)

My invention relates to photographic copying apparatus and particularly to a copying machine for rapidly making photographic copies of documents such as checks, way bills, insurance policies and other written or printed matter of which a photographic record may be desired.

A particular object of my invention lies in the provision of a novel actuating means whereby at one operation the subject to be photographed is held in proper position, illuminated, exposed to a sensitized medium, the sensitized medium moved after exposure to present a new surface for the next exposure, then the illuminating means extinguished and the holding means for the document released.

Another object is to provide a novel shutter actuating means and winding means for the sensitized medium, operated simultaneously with and controlled by the primary operating means above referred to.

Still another object of my invention lies in the provision of a novel means for insuring completion of each operation of the actuating means once it has been started, thus eliminating the chances for spoiling exposures.

My invention embodies many other details which comprise objects and advantages of this invention and which will be apparent as the description proceeds, reference now being had to the figures of the accompanying drawings forming a part of this application, and wherein like reference numerals indicate like parts.

Figures 1, 2, 3, 4:
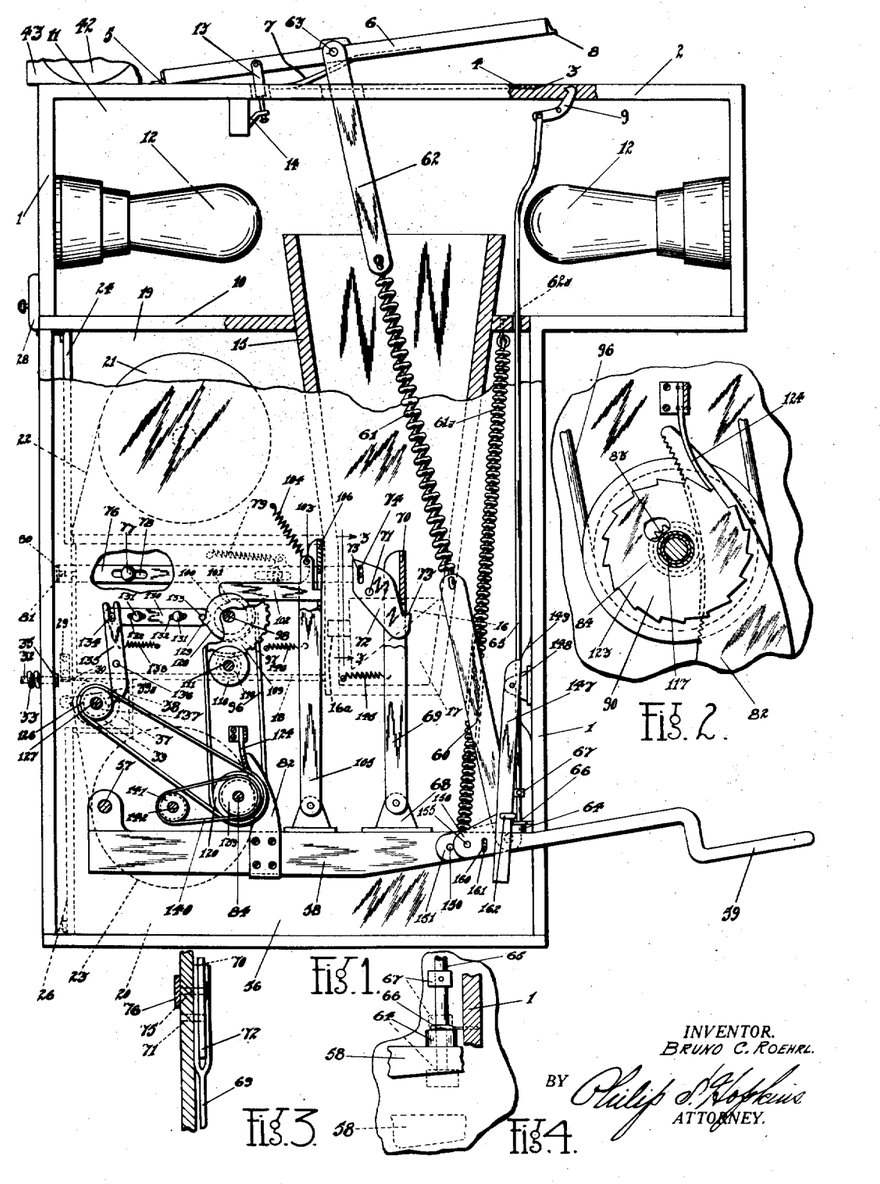
Figure 1 is a side view of an apparatus embodying my invention, illustrating the actuating mechanism thereof, and certain parts being broken away and others in section for clearness of illustration.
Figure 2 is a detail view illustrating a portion of the actuating mechanism and taken on the line 2—2 of Figure 5.
Figure 3 is a detail sectional view taken on the line 3—3 of Figure 1.
Figure 4 is a detail view illustrating the actuation of the locking means for the holding device for the subject to be photographed.

Referring now more particularly to the drawings, the reference character 1 indicates a casing, the top 2 of which is provided with an opening 3 suitably covered by a transparency such as glass 4. Hinged at 5 to the top 2, is a platen or holding member 6 adapted to cover the transparency 4 and to hold any document or other material to be photographed, tightly and in flat position on such transparency. A spring 7 secured to the top 2 and engaging the underside of the platen 6 normally urges the same upwardly as shown in Figure 1. The free end of the platen 6 is provided with a hook member 8 adapted to cooperate with a latching pawl 9 is pivoted within the casing directly beneath the top 2 and adapted to extend upwardly through a suitable opening therein. The operation of this latching means will be explained more fully later.

The upper portion of the casing 1 is provided with a partition member 10 which creates a compartment 11 within which are mounted one or more sources of illumination 12, such as electric lamp bulbs suitably connected to a source of electric current. These lamps are so positioned as to illuminate the copy material to be photographed when placed in position over the opening 3 and under the platen 6.

Attached to the platen 6 is a finger 13 extending downwardly from the top 2 and into operative engagement with an electric contact maker and breaker 14. These parts are so arranged that when the platen 6 is lowered into holding position over the opening 3, the contact maker and breaker 14 is actuated to close a circuit to the lamps 12 and thus illuminate the copy to be photographed. Likewise when the platen 6 is raised the contact is broken and the lights are extinguished. The detail of the electric circuit necessary to accomplish this operation has not been shown as it forms no part of this invention.

Figures 9, 10:
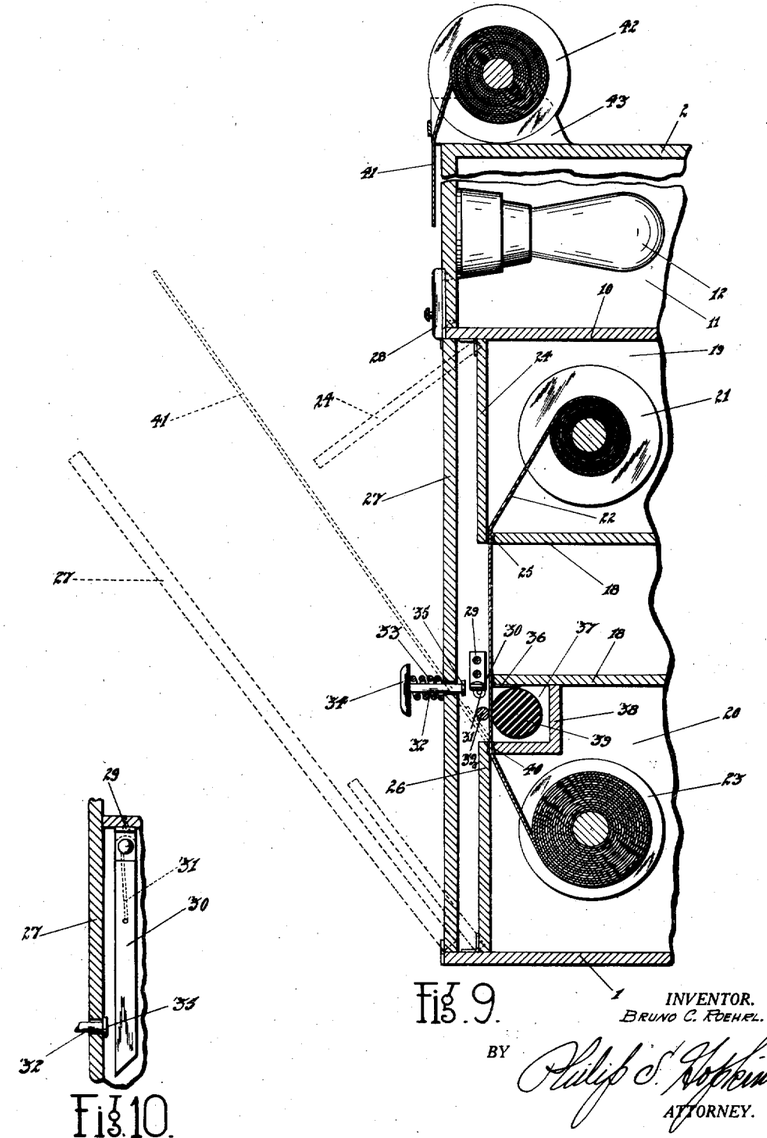
Figure 9 is a detail sectional view through the exposure section of the apparatus and illustrating the relation of the sensitized material thereto.
Figure 10 is a detail view showing the cutting means for the sensitized material.

Projecting upwardly through the partition 10 and into the compartment 11 in alignment with the opening 3 is a bellows member 15 projecting downwardly into the lower part of the casing and adjacent the lower end of which there is provided a prism 16 or other reflecting member adapted to receive the illuminated image from the opening 3 and reflect it at right angles through a lens 16a and an opening 17 in the bellows 15 toward the front of the casing 1, through a passageway formed by partitions 18 (see Figures 1 and 9). These partitions 18 also act as parts of enclosures 19 and 20 within the casing. The enclosure 19, directly underneath the partition 10 at the front of the casing is adapted to suitably rotatably receive a supply spool or reel 21 upon which a supply of sensitized material such as photographic paper 22 is wound and which is adapted to be unwound from the supply reel 21 past the front of the passage communicating with the reflecting member 16. The front end of this passage therefore comprises the exposure position for the sensitized paper 22. The compartment 20 is adapted to rotatably receive a take up reel 23 to which the lower end of the sensitized paper may be attached and upon which said paper may be wound step by step as it is exposed in a manner to be described.

The supply compartment 19 is closed at its front by a swinging door 24 which at its lower edge forms a light-tight closure for the supply compartment but permits the ready withdrawal of the sensitized paper therefrom. Any suitable means may be provided for this purpose such as a strip of velvet or light-tight material 25 at the lower end of the door 24 engageable with the sensitized paper 22.

Similarly a pivoted closure member 26 is provided for the front of the compartment 20.

A hinged door 27 is provided for the front of the casing 1 and has at its free end a suitable latching mechanism 28 whereby the same may be locked in closed light-tight position with respect to the exposure chamber within the casing. This door, however, provides easy and ready access to the exposure chamber when such access is desirable.

Pivoted to a suitable bracket 29 on the side wall of the casing 1 and immediately adjacent the lower edge of the exposure chamber is a knife 30 (see Figures 7, 9 and 10) provided with a spring 31 normally urging the knife out of paper engaging position. Slidably mounted in a suitable opening in the door 27 is a pin 32 normally urged outwardly by a spring 33. This pin is provided with a head 34 on its outer end by means of which it may be pushed inwardly manually to cause its inner headed end 35 to engage with the knife 30 and cause it to rock on its pivot into cutting engagement with the sensitized paper 22 at a point just ahead of where such paper enters the take up chamber 20.

The purpose of this cutting or severing means is that it may be desired to remove the take up reel 23 with the exposed paper thereon at a given time in order that the latent images thereon may be developed. It is not necessary, therefore, to wait until the entire reel of unexposed paper on the supply reel 21 has been exposed before developing and processing the exposed portion of the sensitized web. Directly underneath the lower partition 18 and secured to the underside thereof, is a fixed knife blade 36 which cooperates with the pivoted knife 30 in severing the paper strip.

Directly beneath the lower partition 18 and adjacent its front end is provided a compartment 37 by means of the walls 38 within which is rotatably mounted a feed roller 39 preferably of rubber or other suitable material adapted to engage frictionally with the paper strip 22, and upon rotation of the roller 39 to feed the strip 22 downwardly pulling it from its supply reel 21. The detailed operation of this roller will be more fully described hereafter. There is a suitable light-tight passage provided into the take up compartment 20 from the compartment 37 such as for instance a light trapped slot 40 at the lower front edge of the compartment 37 (see Figure 9). Roller 39a opposes roller 39 and provides the necessary driving friction.

If it is desired to remove an exposed section of the paper strip 22 which has been wound upon the take up reel 23, the operator presses inwardly on the pin 22 causing the web to be severed by the knives 30 and 36. The door 27 is then opened and a strip of protective paper or other material 41 is pulled downwardly from its supply reel 42 suitably mounted upon a bracket 43 on the top 2 of the casing and its lower end suitably attached as by gluing to the severed end of the paper strip 22 which projects out of the take up compartment 20, such end having been left by the cutting operation between the knives and the slot 40 in the compartment 38. Means are provided and will be shortly described for manually rotating the take up reel 23 whereby a desired amount of this protective paper covering 41 can be wound upon the supply reel 23 over the exposed sensitized paper, in order that it may be safely removed from its compartment to the usual dark room for developing. The swinging door 26 permits this removal as also the insertion of a new take up spool. The knife severing means 30 and 36 can, of course, be used to sever the protective paper strip 41 when a sufficient amount has been wound.

When a new take up spool is inserted the lower end of the paper strip 25 is attached thereto and when the light-tight doors 26 and 27 are closed the take up spool 24 may be rotated a few turns to wind thereon first the end of the strip 22 which was exposed while the doors were open. The apparatus is then again ready for operation.

Figure 7:
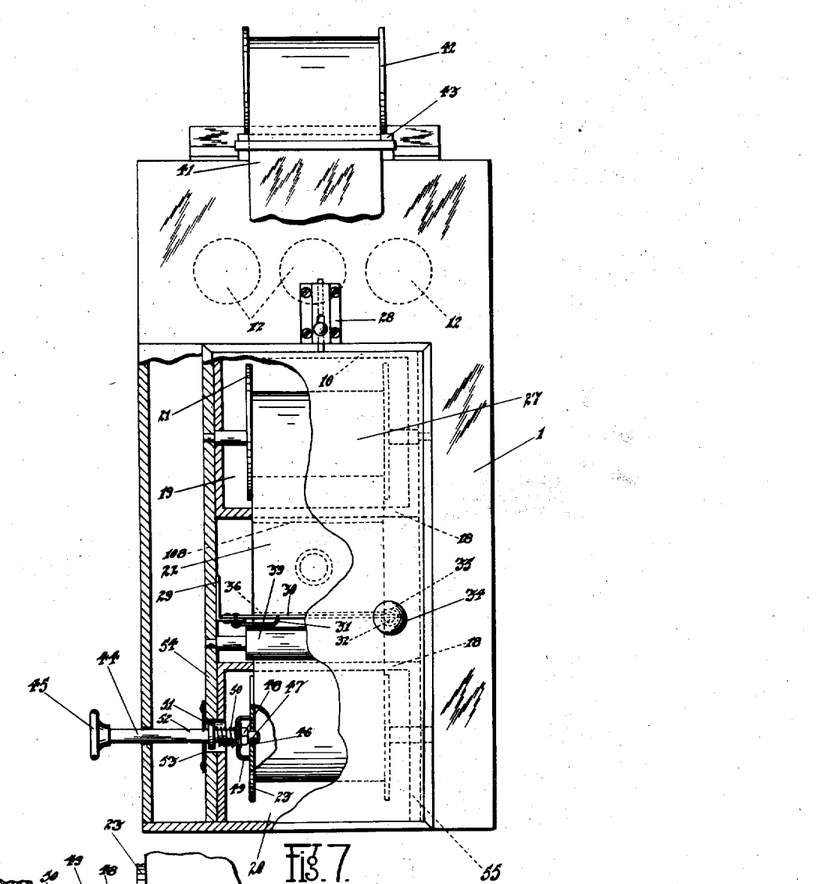
Figure 7 is a front plan view of the apparatus, certain parts being broken away for clearness.
Figure 8:
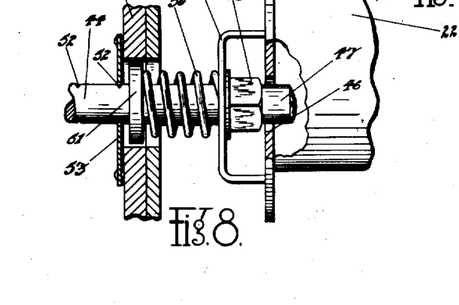
Figure 8 is a detail enlarged view showing means for manually rotating the take up reel of the sensitized material.

The means for manually rotating the take up spool 23 is illustrated clearly in Figures 7 and 8 and comprises a rotatable pin 44 provided with finger piece 45 on its outer end, such pin projecting through a suitable opening in the side wall of the casing 1, for ready manipulation. The flange of the take up spool 23 is provided with a squared opening 46 into which is normally adapted to project the reduced rounded end 47 of the pin 44. This rounded end 47 acts merely as a guide for the pin and does not engage rotatively with the spool. Adjacent this inner end of the pin 44, however, and spaced slightly from the rounded end 47, is a squared portion 48 adapted to engage within the squared opening 46 in the spool flange when the pin 45 is pushed inwardly and in such position the squared portion provides a rotating means for the spool 23. A flanged cup member 49 is loosely mounted on the pin 45 and is normally urged into spool flange engaging position by a coil spring 50 surrounding the pin 45 and positioned between such flanged cup and a coil 51 pinned upon the shaft 45. Thus the spring 50 normally urges the pin 44 outwardly to the normal position shown in Figures 7 and 8.

The pin 44 is notched as at 52 to receive a light spring member 53 secured upon the partition 54 within the casing whereby the pin 44 may be frictionally held in both its inner and outer positions.

Obviously the operation of this mechanism is that when it is desired to manually rotate the take up spool 23, the pin 44 is pushed inwardly to bring the squared portion 48 into the squared opening 46 whereupon the spool may be rotated. When such manual rotation has been completed, the pin is pulled outwardly to the position shown in Figures 7 and 8.

On the opposite side of the casing 1 from the partition 54 just referred to, there is a second partition 55 extending vertically of the casing and separating the spool compartments from the adjacent side wall of the casing and providing a compartment 56 in which are mounted most of the operating mechanisms connected with this apparatus.

Suitably pivoted within this compartment 56 as at 57 is an operating lever 58, the free end of which extends through the rear of the casing and is provided with a foot piece 59 by means of which the lever may be rocked downwardly on its pivot.

Suitably pivoted to the lever 58 within the casing 1, is a link 60 extending upwardly within the compartment 56 for a substantial distance and to the upper end of this link is attached a coil spring 61, the opposite end of which is attached to a similar link 62 pivoted as at 63 to the platen 6, the link 62 extending through a suitable slot or opening in the top 2. Suitably secured to the partition member 10 as at 62a is a second coil spring member 61a, the lower end of which is secured to the lever 58. The object of this coil spring member 61a is to provide sufficient tension to return the lever 58 to its normal position after each operation. The tension of the spring 61 is so adjusted that downward movement of the lever 58 results in pulling the platen 6 downwardly into tight flat engagement with the transparency 4 in the top 2 and at the same time permits the further downward movement of the lever 58 after such platen is in its lower copy engaging position.

Resting upon the upper surface of the lever 58 is the weighted lower end 64 of a rod 65 extending upwardly in the casing 1 through a suitable opening in the partition 10 and attached at its upper end to one end of the pivoted latch 9. This rod 65 is guided in its vertical reciprocal movements by the opening through the partition 10 and adjacent its lower end by a guide link 66 secured to the adjacent wall of the casing 1.

Spaced above the weighted end 64 the rod 65 is provided with a collar 67. The operation of these parts is as follows: When the lever 58 is depressed the weight 64 on the lower end of the rod 65 causes such rod to follow the lever 58 downwardly until the collar 67 engages with the fixed guide link 66. In such downward position, the latch 9 will obviously be rocked on its pivot to engage over the hook 8 on the platen 6 and thus lock such platen in its lowermost position. The relation of movement between the platen and the rod 68 is so designed that the platen will reach its lowermost position just prior to the moving of the latch 9 into locking position. Obviously upon raising the lever 58 again the rod 65 is raised to release the latch 9 and permit the spring 7 to raise the platen 6 to the position shown in Figure 1.

It may be said generally here that the downward movement of the lever 58 performs many functions through associated agencies which will now be described in detail. These functions are in addition to those just described, the tensioning of shutter rotating means and paper moving means, the release of such means and the operation thereof, also a punching device for the paper strip for a purpose to be described.

Secured to the lever 58 is a bracket 68 pivoted to which is the lower end of an arm 69 extending upwardly and provided at its upper end with an angular flange 70. Suitably pivoted at 71 adjacent the upper end of the arm 69 is a pawl 72 provided at one end with a shouldered hook portion 73 lying normally underneath the flange 70. The opposite end of the pawl 72 and on the opposite side of the pivot 71 from the hook portion, has a slot 74 engaging within which is a pin 75 carried by one end of a longitudinally slidable rod 76 guided in its sliding movement by pins 77 extending through slots 78 in the rod. The rod 76 is normally urged to the left in Figure 1 by means of a coil spring 79, thus normally rocking the pawl 72 to the position shown in Figure 1. The free end of the rod 76 is provided with an angular flange 80 upon which is a punch pin 81 disposed just in front of the paper strip 22. This pin is adapted, when the rod 76 is moved to the right, to engage and punch a hole in the edge of the paper strip 22 where it passes over a guide flange or partition 30 past the exposure position. Obviously upon depression of the lever 58 the link 69 is lowered therewith which engages the lower end of the pawl 72 rocking the same on its pivot and causing the rod 76 to slide to the right and bring about this punching operation just described. As is illustrated clearly in Figures 11 and 12, the downward movement of the arm 69 is such that the pawl 72 is rocked far enough to permit the arm 69 its full downward movement without interference. Obviously the return movement of the arm 69 upwardly permits the pawl 72 to again rock on its pivot in response to the spring 79.

The punching of the hole in the paper 22 is to provide a mark defining each exposure section of the paper in order that such sections may be properly separated and also provides a filing mark or guide for the individual photographic copies after development and other processes.

Secured to the lever 58 is an upstanding arcuately shaped toothed rack bar 82 meshing with a pinion 83 on a shaft 84. This shaft 84 is journaled in the adjacent side wall of the casing 1 and in the partition 55 and extends across the compartment 56 (see Figure 5). Rotatably disposed upon the shaft 84 is a sleeve 85 provided with an offset portion 86 surrounding the shaft.

Figures 5, 6:
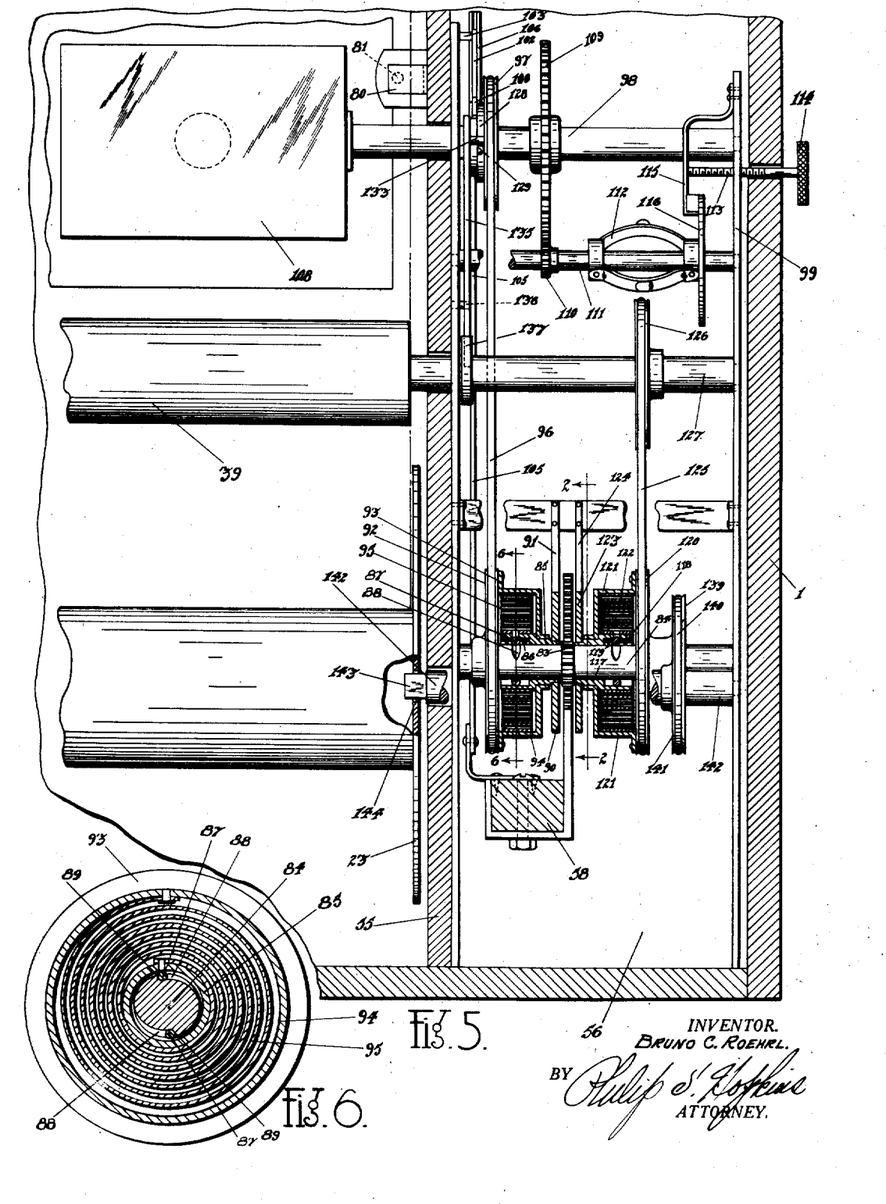
Figure 5 is an enlarged sectional view of a portion of the actuating mechanism illustrating its operative relation to the shutter and winding means.
Figure 6 is a detail sectional view taken on the line 6—6 of Figure 5.

Between this offset portion of the sleeve 85 and the shaft 84 is a ball clutch arrangement 87 of a conventional type and illustrated clearly in Figure 6. The shaft 84 at this point is provided with grooves 88, such grooves being cam-like in shape and provided with straight shoulder stops 89 at their ends and within which grooves the balls 87 are positioned. The operation of this type of clutch is well known and it will be obvious that upon rotation of the shaft 84 to the left in Figure 6, a binding action will occur between the cam grooves in the shaft, the balls 87, and the sleeve portions 86, resulting in rotation of the sleeve with the shaft 84.

The sleeve 85 is provided with a toothed ratchet wheel 90 (see Figures 2 and 5), with which engages a fixed resilient spring brake 91. Rotatably mounted upon one end of the shaft 84 is a pulley 92 and to the inner side of this pulley is suitably secured a cup-like housing member 93. This housing member 93 is provided with a flange 94 which encircles the sleeve 85 and is rotatable with respect thereto. Within the housing 93 is disposed a coil spring 95, one end of which is secured to the housing 93 and the other end of which is secured to the portion 86 of the sleeve 85. Obviously therefore, rotation of the shaft 84 by the downward movement of the lever 58 and the rack bar 82 meshing with the pinion 83, results in rotating the sleeve 85 through the clutch connection 87 to place the spring 95 under tension, the housing 93 and the pulley 92 being held against rotation by a means shortly to be described. The spring latch 91 holds the sleeve in the position to which it is rotated by the operation just described.

Engaging around the pulley is an endless belt 96 also encircling a pulley 97 fixed upon a shaft 98 journaled in the partition 55, and its outer end in a supporting plate 99 suitably provided adjacent the wall of the casing 1. Fixed to the inner surface of the pulley 97 is a disk 100 provided with a single tooth 101 adapted to be engaged by the hooked end of a latch 102 suitably pivoted as at 103 to some fixed part in the casing. A coil spring 104 normally rocks such latch on its pivot to urge it into latching engagement with the disk 100. Pivotally supported upon the lever 58 is an upstanding arm 105 provided at its upper end with a flange 106, the lower edge of which is adapted to engage, when the lever 58 is lowered, with an extension 107 on the latch 102 causing such latch to rock on its pivot and release its engagement with the disk 100. These parts are so arranged that this releasing action takes place when the lever 58 is close to its lowermost position.

The releasing of the latch 102, of course, permits the coil spring 95 to expend its energy which was stored by the turning of the sleeve 85 upon the downward movement of the lever 58 as previously explained, and thus causes through the belt 96, the rotation of the shaft 98. The inner end of the shaft 98 extends through the partition 55 and carries a shutter 108 which lies in the exposure path between the reflecting member 16 and the sensitized paper strip 22. The details of this shutter have not been shown as they form no part of this invention. A conventional shutter of the barrel type may be used which, as is well known, upon one complete revolution, serves to open and close the passage with which it is aligned.

The shaft 98 is provided with a gear 109 which meshes with a pinion 110 on a shaft 111 upon which shaft is mounted a centrifugal governor 112 of any conventional design and which may be provided with the adjusting means comprising the headed screw 113 having a finger piece 114 on its outer end and engageable at its inner end with a bracket 115 cooperating with the rotatable disk 116 of the governor. Thus the speed of the shutter shaft 98 in its rotation through the power of the spring 95 is regulated and controlled.

Referring again now to Figures 1 and 5, it will be observed that there is provided a second spring motor, the associated parts of which are identical in every respect with those just described. This includes the sleeve 117 with its portion 118 spaced from the shaft 84, the ball clutch 119, the pulley 120 loosely mounted on the shaft 84, the spring housing 121 secured to the pulley 120, and the spring 122 secured at one end to the housing and at the other end to the portion 118 of the sleeve. The sleeve 117 is also provided with the toothed disk 123 with which engages the spring brake or holding means 124. The operation of this is the same as previously described for the one spring motor, namely, upon the downward movement of the lever 58 the rack bar 82 rotates the shaft 84 through pinion 94 and through the clutch 119 the sleeve 117 is rotated with the shaft to tension the spring 122, the pulley 120 being held against movement by means to be described presently. It will also be understood, of course, that upon the upstroke or return of the lever 58, the shaft 84 is free to rotate without affecting the spring motors in any way due to the ball clutch mechanisms just described.

An endless belt 125 engages the pulley 120 and also engages around a pulley 126 fixed to a shaft 127 journaled in the supporting plate 99 and in the partition 55, and the inner end of which shaft extends into the compartment 37 (see Figure 9). The friction driving roller 39 for the paper strip is mounted upon the inner end of this roller in position to frictionally engage the paper strip and pull it downwardly from the supply reel 21 as before explained.

The releasing means for this drive roller will now be explained.

Fixed upon the shaft 98 adjacent the toothed disk 100, is a disk 128 provided at one point on its periphery with a projecting cam portion 129.

Suitably slidably mounted upon a fixed portion in the casing 1, is a link 130 guided by the pins 131 and slots 132. One end of this link lies adjacent the disk 128 and is provided with a pin or roller 133 adapted to lie in the path of the projecton 129 on such disk. The opposite end of the link 130 is provided with a pin 134 engaging in the forked end of a latch 135 pivoted at 136 and the opposite end of which is adapted to engage the notched periphery of a disk 137 fixed to the shaft 127. A coil spring 138 normally urges the latch 135 into such disk engaging position and in such position the roller 133 on the link 130 lies in the path of the projection 129 on the disk 128.

The operation of this mechanism is as follows: Upon the release of the shaft 98 for rotation in the manner above explained, the disk 128 rotates therewith one complete revolution and just prior to the completion of such a revolution the projection 129 strikes the pin 133 resulting in sliding the link 130 to the left in Figure 1, which rocks the latch 135 on its pivot to release the disk 137 and shaft 127 for rotation. One complete rotation of the shaft 127 and consequently of the feed roller 39 is thus accomplished and the latch 135 again engages the notched disk 137 under the influence of the spring 138 to prevent more than one revolution at a time. It will be clear, of course, that as soon as the projection 129 has passed the pin 133, the link 130 will again slide back to the normal position shown in Figure 1. The operation of the mechanism just described is so timed with respect to the other elements described that the movement of the paper 22 occurs immediately following the opening and closing of the shutter 108. It may be stated also that the size of the feed roller 39 is such that one complete revolution thereof serves to move the paper strip 22 an amount sufficient to bring a new unexposed section thereof into exposure position.

The hub of the pulley 120 carries a second pulley 139 around which engages an endless belt 140 also engaging around a pulley 141 upon a shaft 142 journaled in the supporting plate 99 and in the partition 55. The inner end of this shaft 142 is reduced and squared as at 143 for engagement within a squared opening 144 in the adjacent end of the take up reel flange 23. A suitable slip connection between the pulleys 139 and 141 is provided either in the form of a relatively loose belt or an elastic belt or by some conventional clutch means (not shown) whereby the drive from the pulley 139 to the take up reel is effective only when there is no resistance and capable of slipping when the paper fed by the feed strip 39 has been wound upon the take up reel. This is in order to compensate for the varying diameter of the take up reel 23 as the paper is wound thereon.

It may be noted here that the arm 69 is normally urged to the left into engagement with the pawl 72 by means of a coil spring 145. Also the arm 105 is normally urged to the left in Figure 1 into cooperative relation with the latch 102 by the coil spring 146.

Figures 11, 12:
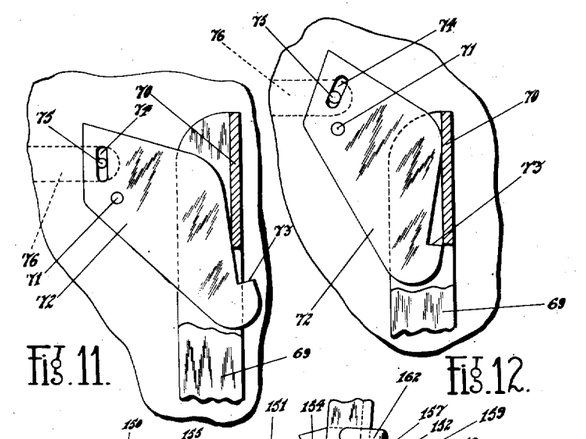
Figure 11 is a detail view of one of the releasing devices of the actuating mechanisms.
Figure 12 is a similar detail view illustrating this releasing mechanism in another position.

From the description thus far it will be seen that upon the downward movement of the lever 58, the platen 6 will first be lowered and latched, the lamps 12 illuminated, the paper strip 22 punched by the punch 81, and the punch released from the strip when the arm 69 reaches the position shown in Figure 12, in which position the spring 79 is strong enough to return the sliding link 76 to the left in Figure 1, the latch 72 in such position merely rocking the arm 69 to the right against the tension of the spring 145.

During this downward movement of the lever 58, the spring motors 95 and 122 are being tensioned by means of the rack bar 82. As the lever 58 approaches its lowermost position, the shutter 108 is operated to expose the section of paper 22 in alignment with the reflector 16 by means of the arm 105 tripping over the latch 102 and releasing shaft 98 to rotate under the influence of spring motor 95. Rotation of the shaft 98 also actuates the latch 135 to release the feed roller shaft 127 for rotation, this occurring immediately following the operation of the shutter.

As before stated, the return movement of the lever 58 under the influence of the springs 61 and 61a merely results in idly rotating the shaft 84 and restoring the parts above mentioned to their normal positions shown in Figure 1.

It will be obvious from this description that unless the lever 58 is depressed fully and completely, that is, far enough to result in all the operations just referred to, the result might be to merely expose the paper 22 and not move the same to bring a new section into position for exposure. In order, therefore to insure the full operation of the device as described at each operation of the lever 58, means have been provided to prevent the return of the lever 58 to its upper normal position after once started downwardly, until it has been depressed to its lowermost position to bring about the operations described. This safety means includes a channel member 147 pivoted adjacent its upper end to a bracket 148 fixed to a wall of the casing 1. A leaf spring 149 is disposed between the wall of the casing and the upper end of the channel member 147, permitting the channel member to swing freely on its pivot but normally urging the lower end of the channel member 147 away from the adjacent wall of the casing.

Figures 13, 14:
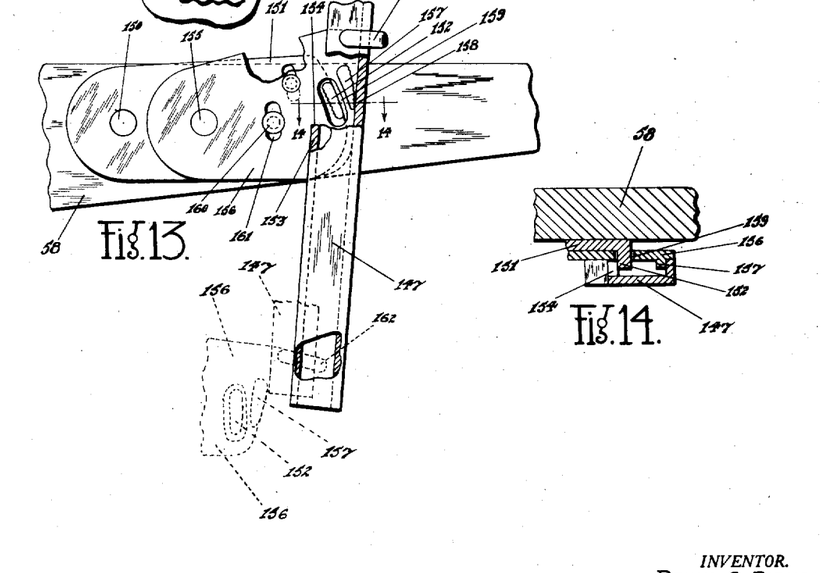
Figure 13 is a detail view of the locking means for the actuating mechanism.
Figure 14 is a detail sectional view taken on the line 14—14 of Figure 13.

Pivoted at 150 to the lever 58 is a pawl 151 the free end of which is provided with an angularly extending toothed portion 152, the toothed surface of which is adapted to engage the left hand flange 153 of the channel member (the left hand flange in Figure 13). It will be noted with reference to Figure 13 that this flange 153 is cut away at 154 and in the normal upper position of the lever 58 this toothed portion on the pawl 151 lies above such cut away portion.

Pivoted at 155 to the pawl 151 is a second pawl 156 provided adjacent its free end with an angular toothed portion 157 the teeth of which are adapted to engage the opposite flange 158 of the channel member 147. It will be noted with reference to Figure 14, the angular toothed portion 152 of the pawl 151 passes through a slot 159 in the pawl 156 in order that both the toothed portions 152 and 157 can be positioned within the channel member 147, in position to cooperate with the flanges 153 and 158 thereof.

A headed pin 160 carried by the pawl 151 extends through a slot 161 in the pawl 156 and serves to guide and limit the relative movements of said pawls.

The free end of the pawl 156 is provided with a bent hook guide member 162 which extends around the outside of the channel member 147 as shown clearly in Figure 13.

From this construction it will be apparent that upon the downward movement of the lever 58, both of the toothed portions 152 and 157 will slide along within the channel member 147 freely and the channel member 147 will swing on its pivot as shown in dotted lines in Figure 13 to follow the arc of travel of the lever 58. If, however, the downward movement of the lever 58 should be stopped inadvertently at any point between the cutaway portion 154 of the flange 153, and the open bottom end of the channel member 147, the normal upward movement of the lever 58 under the influence of the coil springs 61 and 61a would result immediately in the toothed portion 157 engaging the flange 158 frictionally thus interrupting the upward movement of the pawl 156 which would result in relative movement between the pawls 151 and 156 tending to separate the toothed portions thereof and causing the toothed portion 152 to bind against the flange 153 thus locking the lever 158 against upward movement. The length of the channel member 147 is such that when the lever has been lowered to a position which permits the toothed portions 152 and 157 to pass completely out of the lower end of the channel 147, all of the operations resulting from such downward movement of the lever will have taken place. When such pawls reach the open lower end of the channel member 147, and pass out of such channel member, the spring 149 serves to rock the channel member slightly to the right, returning it to its normal position shown in Figure 1, it having been pulled slightly to the left by the downward movement of the pawls with the arc of the lever 58, whereupon the springs 61 and 61a may exert its influence to raise the lever 58, the toothed portions 152 and 157 sliding freely upwardly along the side of the flange 153 until they reach the cut out portion 154, the channel member 147 swinging to the right against the tension of the spring 149 until they reach the cut out portion 154 whereupon the channel member again swings to the left to normal position with the toothed members ready to again slide downwardly inside the flanges of the channel member upon the next operation of the lever 58.

Of course, changes may be made in details of construction without departing from the spirit and scope of my invention. I do not limit myself, therefore, to the exact structure herein shown and described other than by the appended claims.

I claim:

1. A photographic copying apparatus comprising a casing, a copy holder thereon having a pivoted platen, illuminating means therefor, film holding means in said casing, a shutter in the exposure path between said copy holder and said film, a single actuating means movable through a predetermined path, means actuated by the movement of said last named means in one direction for successively operating said platen, illuminating means and shutter, and means preventing the return movement of said actuating means prior to completion of the full stroke thereof in the first named direction.

2. A photographic copying apparatus comprising a casing, a copy holder thereon having a pivoted platen, illuminating means therefor, film supporting and moving means in said casing, film perforating means, a shutter in the exposure path between said copy holder and said film, a single actuating means movable through a predetermined path, and means actuated by the movement of said last named means for successively operating said platen, illuminating means, film punching means, shutter and film moving means.

3. A photographic copying apparatus comprising a casing, a copy holder thereon, illuminating means therefor, film supporting and moving means in said casing, a shutter in the exposure path between said copy holder and said film, a single actuating means movable through a predetermined path, means actuated by the movement of said last named means for successively operating said copy holder, illuminating means, shutter and film moving means, said shutter and film moving means comprising spring actuated members, and means on said single actuating means for tensioning the springs of said members during the actuating movement of said means.

4. A photographic copying apparatus comprising a casing, a copy holder thereon having a pivoted platen, illuminating means therefor, film supporting and moving means in said casing, a shutter in the exposure path between said copy holder and said film, a single actuating means movable through a predetermined path, means actuated by the movement of said last named means for successively operating said platen, illuminating means, shutter and film moving means, and independent manually operable means for moving the film.

5. A photographic copying apparatus comprising a casing, a copy holder thereon having a pivoted platen, illuminating means therefor, film supporting and moving means in said casing, a shutter in the exposure path between said copy holder and said film, a single actuating means movable through a predetermined path, means actuated by the movement of said last named means for successively operating said platen, illuminating means, shutter and film moving means, independent manually operable means for moving the film, and film severing means in said casing whereby the exposed portion of the film may be removed.

6. A photographic apparatus comprising a casing, a pivoted copy holder thereon, illuminating means therefor, an actuating lever having spring connection with said holder whereby movement of said lever in one direction moves said holder to holding position, means actuated by said holder in holding position to render said illuminating means operative, means actuated by the movement of said lever in one direction for locking said holder in holding position, and means actuated by the movement of said lever in the opposite direction for releasing said locking means.

BRUNO C. ROEHRL.